(12) United States Patent
Hudson et al.

(10) Patent No.: US 8,777,131 B2
(45) Date of Patent: Jul. 15, 2014

(54) SPRINGLESS SHUT-OFF VALVE FOR LIQUID SPRAYERS

(75) Inventors: William A. Hudson, Fox Point, WI (US); Wayne J. Beissel, Hastings, MN (US)

(73) Assignee: H.D. Hudson Manufacturing Company, Chicago, IL (US)

( * ) Notice: Subject to any disclaimer, the term of this patent is extended or adjusted under 35 U.S.C. 154(b) by 218 days.

(21) Appl. No.: 13/215,739

(22) Filed: Aug. 23, 2011

(65) Prior Publication Data

US 2013/0048761 A1 Feb. 28, 2013

(51) Int. Cl.
*B05B 1/30* (2006.01)
*B05B 7/02* (2006.01)
*B05B 9/01* (2006.01)
*F16K 39/00* (2006.01)
*F16K 1/00* (2006.01)
*F16K 15/00* (2006.01)

(52) U.S. Cl.
USPC ........... 239/583; 239/525; 251/282; 251/318; 251/319; 251/325

(58) Field of Classification Search
USPC .......... 239/525, 526, 530–532, 583; 251/282, 251/318, 325, 319
See application file for complete search history.

(56) References Cited

U.S. PATENT DOCUMENTS

| | | |
|---|---|---|
| 801,210 A | 10/1905 | Burnett |
| 1,428,530 A | 9/1922 | Cassidy |
| 3,006,560 A | 10/1961 | Rosenkranz |
| 3,071,402 A | 1/1963 | Lasto et al. |
| 3,072,345 A | 1/1963 | Lennon |
| RE26,013 E | 5/1966 | Lennon |
| 3,419,197 A * | 12/1968 | Battaglia ........................ 222/485 |
| 3,632,083 A | 1/1972 | Meeks |
| 3,768,777 A | 10/1973 | Hechler, IV |
| 4,102,500 A * | 7/1978 | Luff ............................... 239/345 |
| 4,161,289 A * | 7/1979 | Rebold .......................... 239/346 |

(Continued)

FOREIGN PATENT DOCUMENTS

| | | |
|---|---|---|
| GB | 2461139 A | 12/2009 |
| WO | WO-93/14880 A1 | 8/1993 |

OTHER PUBLICATIONS

European extended search report from corresponding European application No. EP12162446.4, dated Jun. 20, 2012.

*Primary Examiner* — Len Tran
*Assistant Examiner* — Alexander M Valvis
(74) *Attorney, Agent, or Firm* — Marshall, Gerstein & Borun LLP

(57) ABSTRACT

A springless valve that is used for a liquid sprayer has a body that has an upstream bore that has three parts with increasingly larger cross-sections. A pin portion of a slide/pin combination moves between an open position and a closed position. In the open position, liquid in the first part of the upstream bore flows into inlets in the third part of the upstream bore, through a central passage, to an outlet to a downstream bore. A linearly-moving slide portion on the slide/pin combination fits within a recess in the body, and has resilient arms that engage front and rear radial faces on a narrowed waist on the pin. The arms extend over opposed sides of the narrowed waist, have tangs that lock onto a lower side of that waist, and rigidly connect the slide portion to the pin portion, enabling a user to move the slide/pin combination axially between the open and closed positions.

4 Claims, 12 Drawing Sheets

(56) References Cited

U.S. PATENT DOCUMENTS

| | | | |
|---|---|---|---|
| 4,586,539 A * | 5/1986 | Ueno | 137/625.38 |
| 4,764,047 A * | 8/1988 | Johnston et al. | 401/289 |
| 4,933,569 A * | 6/1990 | Merchlewitz | 251/282 |
| 5,094,400 A * | 3/1992 | Ching | 239/341 |
| 5,143,299 A * | 9/1992 | Simonetti et al. | 239/526 |
| 6,726,125 B1 * | 4/2004 | Nonis et al. | 239/375 |
| 6,749,133 B1 * | 6/2004 | Ketcham et al. | 239/318 |
| 6,796,515 B2 * | 9/2004 | Heren et al. | 239/526 |

* cited by examiner

SPRINGLESS SHUT-OFF VALVE FOR LIQUID SPRAYERS

CROSS-REFERENCE TO RELATED APPLICATIONS

Not applicable.

BACKGROUND OF THE INVENTION

The present invention relates generally to shutoff valves for liquid sprayers such as those used for insect control or lawn and garden use. In particular, the invention relates to valves that do not require a spring to hold the valve closed.

In the 1980's, H.D. Hudson Manufacturing Company developed a successful springless shut-off valve for liquid sprayers. In that sprayer valve, as explained in U.S. Pat. No. 4,933,569, the liquid travelled through a special reciprocating pin that was mounted for axial movement within a new valve body.

The valve body had a front section and a rear section. The front section had a downstream bore that communicated with a liquid nozzle. The rear section of the valve body had an upstream bore that could be attached to a liquid supply line and had three parts that each had different cross-sectional areas. The first part of the upstream bore had a relatively small cross-sectional area and communicated with a liquid supply inlet. The second part was downstream of the first part and had a larger cross-sectional area than the first part. The third part was downstream of the second part and had an even larger cross-sectional area.

A wall joined the two sections. A recess between two segments of the wall provided access to the upstream and downstream bores, as well as to a chamber on the opposite side of the bore.

The pin fit within the bores. It had a waist section that separated a downstream section and from three upstream sections. The downstream section fit within the downstream bore in the valve body, and had an o-ring that formed an upstream seal in that bore.

The first upstream section of the pin was sized to fit snugly within the first part of the upstream bore when the pin was in the closed position. When the pin was moved to the open position, the first upstream section retracted into the second part of the upstream bore, enabling liquid in the first part of the upstream bore to flow into the second part of the upstream bore.

The second upstream section of the pin had a larger cross-sectional area than the first section, and a second o-ring that provided a seal against the second part of the upstream bore when the pin was in the closed position. That section retracted into the third part of the upstream bore when the pin was moved to the open position, permitting liquid in the second part of the upstream bore to flow into the third part of the upstream bore.

The third upstream section of the pin fit within the third part of the upstream bore, had a larger cross-sectional area than the second section, and had a third o-ring that formed a downstream seal in the third part of the upstream bore.

A central passage extended through the pin, from an outlet that was located downstream of the first o-ring to inlets between the second and third o-rings. When the pin was in the open position, liquid could freely flow from the inlet, through the first, second, and third parts of the upstream bore, into the inlets, through the central passage, into the downstream bore, and then to the nozzle. In the closed position, the fit between the first upstream section of the pin and the first part of the upstream bore blocked the flow of liquid, with the second seal helping to prevent leakage.

A user moved the pin from the open position to the closed position by rotating a lever that was pivoted against an internal, upstream-facing shoulder in a radial groove in the chamber opposite the recess. The arm of the lever had a u-shaped notch with detents that engaged the waist of the pin, sliding across pin as the lever was pivoted and converting that rotational movement of the lever into linear movement of the pin.

BRIEF SUMMARY

The applicants have developed an improvement for that valve, replacing the rotating lever with single-piece slide that locks onto the pin. The new arrangement forms a fixed slide/pin combination that has no rotating parts and thus does not require the conversion of rotational movement into linear movement. In one embodiment of the invention, the new slide can be used with the same valve body and pin that was used in the prior valves, without the need for any additional parts or modifications.

Resilient arms on the slide portion engage front and rear radial faces on the waist of the pin portion and extend over opposed sides of the waist. Tangs on the arms lock onto a lower side of the waist, rigidly connecting the slide to the pin, forming a new unitary slide/pin combination.

In another embodiment of the invention, the slide portion of the new slide/pin combination has a planar base that slides along an outer surface of linear wall segments that extend axially on opposed sides of the pin.

BRIEF DESCRIPTION OF THE DRAWINGS

The invention may be better understood by referring to the accompanying drawings, in which.

DETAILED DESCRIPTION

Figure 1:
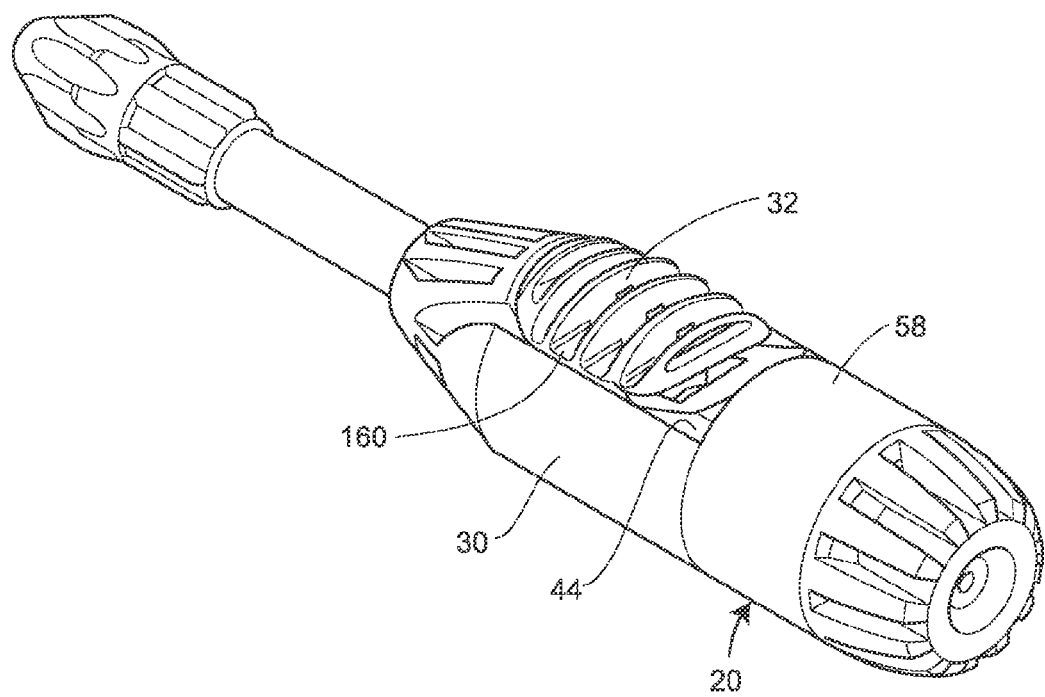
FIG. 1 is a perspective view of a sprayer valve that uses the new invention.
Figure 2:
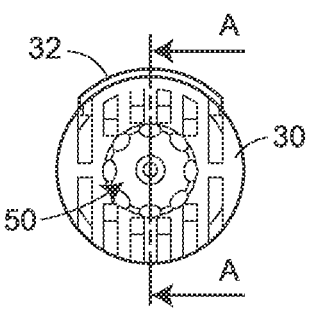
FIGS. 2-4 are front end, side, and rear elevation views of that sprayer valve.
Figure 3:
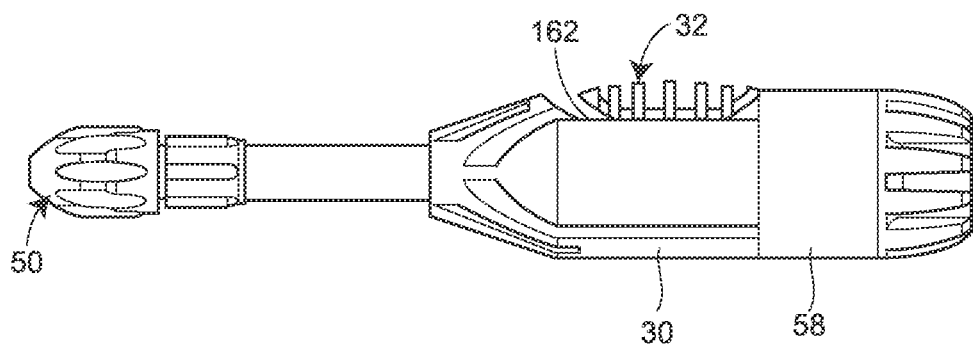
Figure 4:
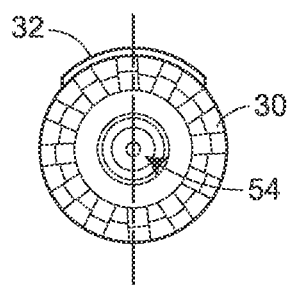

Three different sprayer valves that each use the new invention are seen in the figures. FIGS. 1-7 show a sprayer valve 20 that uses the same body and pin that was used in H.D. Hudson's prior sprayer valves. FIGS. 8-21 show two other sprayer valves 22 and 23 that use a different body but a similar pin.

All three sprayer valves have two general components, a body 30 and a slide/pin combination 32. In the discussion below, these components will first be discussed in general terms. Then the particular elements that differentiate the three sprayer valves will be discussed.

The Body, in General

As best seen in FIGS. 1, 7, 14, and 21, the body 30 in each of the three illustrated sprayer valves has a front section 40, a rear section 42, and spaced wall sections 44. These bodies can be molded from rigid plastic or other suitable material, or, in some circumstances, cut from metal. Each of the elements of the body will be discussed in turn.

The Front Section 40

The front section 40 of the body 30 on all three sprayer valves connects to a nozzle. The illustrated front sections are from ½ inch to several inches long and have a diameter that tapers from less than an inch at the front, downstream end of the body to between 1 and 3 inches at the upstream end of the front section.

Figure 5:
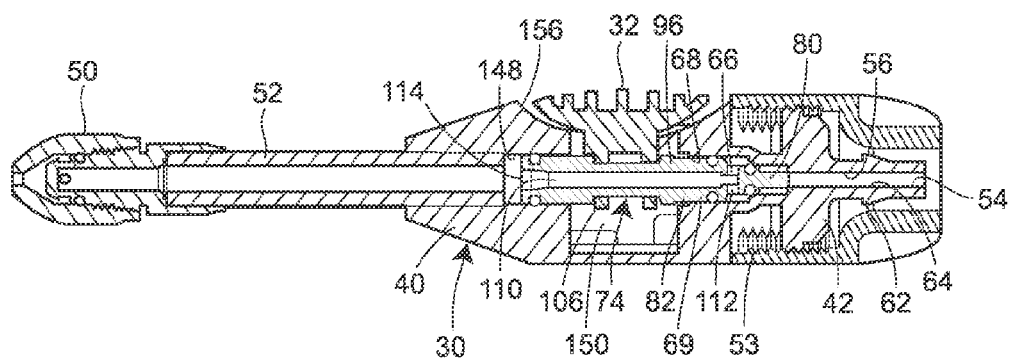
FIGS. 5 and 6 are a cross-sectional views through lines 5-5 in FIG. 4, with the sprayer valve in a closed position in FIG. 5 and in an open position in FIG. 6.
Figure 12:
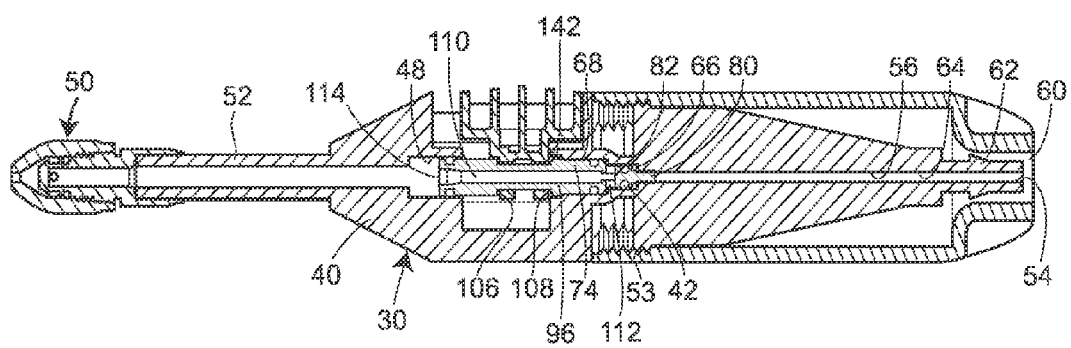
FIGS. 12 and 13 are cross-sectional views of the sprayer valve, with the sprayer valve in a closed position in FIG. 12 and in an open position in FIG. 13.
Figure 19:
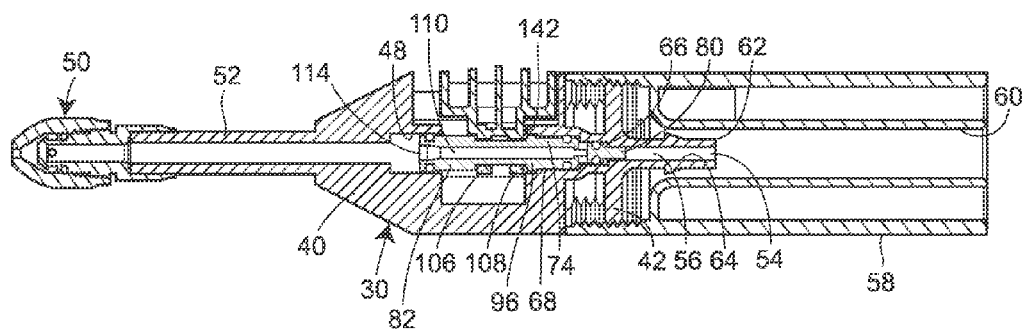
FIGS. 19 and 20 are cross-sectional views of the sprayer valve, with the sprayer valve in a closed position in FIG. 19 and in an open position in FIG. 20.

As best seen in FIGS. 5, 12, and 19, the front section 40 in each illustrated sprayer valve has a cylindrical downstream bore 48 that communicates with a conventional liquid nozzle 50. The bore directs liquid that passes through the slide/pin combination 32 to the nozzle. Each of the illustrated downstream bores has a diameter of between ¼ inch and ⅝ inches. In each of the illustrated sprayer valves, the downstream bore and the nozzle are connected by a tubular extension 52, which can be several inches to a foot or more in length. In these sprayer valves, an upstream end of the extension fits within the downstream bore. Other arrangements can also be used.

The Rear Section 42

The rear section 42 of the body 30 on all three sprayer valves connects to a liquid supply. Each rear section has an external threaded portion 53, a liquid supply inlet 54, and an upstream bore 56.

The illustrated threaded portions 53 (best seen in FIGS. 7, 14, and 21) are from ¼ inch to two inches in length, and have a diameter that is slightly smaller than the diameter of the upstream end of the front section 40. These threads engage internal threads on a shut-off nut 58 that has an external diameter that general matches the diameter of the upstream end of the front section 40 of the body 30, and has a rear opening 60 that accommodates the outer periphery of a liquid supply line (not shown).

The liquid supply inlet 54 of each of the illustrated rear sections 42 is located upstream of the threaded portion 53 and has a barb 62 that locks onto the liquid supply line that is inserted into the rear opening 60, holding the liquid supply line in place.

The upstream bore 56 in the rear section 42 starts at the liquid supply inlet 54, where it receives liquid from the liquid supply line. This first part 64 of the upstream bore has a relatively small cross-sectional area. For ease of manufacture, it may be preferred that this part of the upstream bore be cylindrical. In the illustrated sprayer valves, the diameter of this part of the upstream bore is between ⅛ of an inch and ⅜ of an inch.

A second part 66 of the upstream bore 56 is located downstream of the first part 64. This part has a larger cross-sectional area than the first part and is generally short in length. Again, it may be preferred that this part of the upstream bore be cylindrical. In the illustrated sprayer valves, the second part of the upstream bore is between ⅛ of an inch and ¾ of an inch in length, and between 3/16 of an inch and ½ inch in diameter.

A third part 68 of the upstream bore 56 is located downstream of the second part 66. This part has a larger cross-sectional area than the second part and is generally somewhat longer than the second part. Again, it may be preferred that this part of the upstream bore be cylindrical. In the illustrated sprayer valves, the third part of the upstream bore is between ⅜ of an inch and 1 inch length, and between ¼ of an inch and ⅝ inch in diameter.

The Spaced Wall Sections 44

On all three illustrated sprayer valves, the front section 40 and the rear section 42 of the body 30 are joined by the spaced wall segments 44, which extend from the front section to the rear section. As best see in FIGS. 6, 13, and 20, a recess 70 is provided between two wall of the segments, providing access to the upstream and downstream bores 48 and 56. In each of the illustrated sprayer valves, the recess is between ⅜ of an inch and 1 inch in width, and between ½ inch and 1¼ inch in length.

The Slide/Pin Combination 32, in General

The slide/pin combination 32 is mounted for axial movement with respect to the body 30 between an open position and a closed position. In all three of the illustrated sprayer valves, the slide/pin combination has a pin portion 74 and a slide portion 76, best seen in FIGS. 7, 14, and 21. Each of these elements will also be discussed in turn.

The Pin Portion 74

The pin portion 74 of each of the illustrated sprayer valves has an upstream section 80 and a downstream section 82, separated by a narrowed waist 84. In many cases, the pin portion may be made of metal or rigid plastic. Generally, the pin portion need be only between an inch and a few inches in length, and between ⅛ of an inch and ½ inch in diameter. Potentially aiding in manufacture, the pin portion can often be circular in cross section throughout most of its length.

The Downstream Section

The downstream section 82 of the pin portion 74 fits within the downstream bore 48 of the body 30. A first radial slot 88 in this section of the pin portion is fitted with a first o-ring 90 that forms an upstream seal in the downstream bore. As will be discussed later, liquid enters the downstream bore when the slide/pin combination 32 is in the open position. This seal prevents that liquid from leaking into the recess 70.

The Upstream Sections

As explained above, the upstream bore 56 of the body 30 receives liquid from a liquid supply line. When the slide/pin combination 32 is in the closed position (as seen in FIGS. 5, 12, and 19), the first upstream section 80 of the pin portion 74 of the illustrated sprayer valves fits snugly within the first part 64 of the upstream bore 56. In this position, the fit between the first upstream section of the pin portion and the upstream bore substantially prevents liquid in the upstream bore from flowing past the first upstream section, and thus substantially prevents liquid from flowing through the sprayer valve.

In each of the illustrated sprayer valves, the first upstream section 80 of the pin portion 74 has a cross-sectional area of less than 0.002 square inches. When the slide/pin combination 32 is in the closed position, this relatively small cross-sectional area limits the force of liquid acting on that face of the pin portion, and thus helps to prevent the pressure of liquid from the liquid supply from pushing the slide/pin combination 32 to the open position. The liquid pressure that is exerted when the sprayer valve is in the closed position can be overcome by many means, including, for example, friction within the valve body 30 or even a conventional latch on the slide portion 76.

Figure 6:
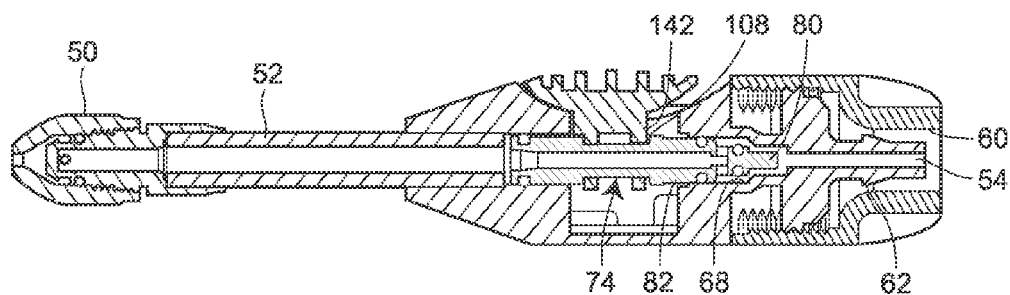
Figure 7:
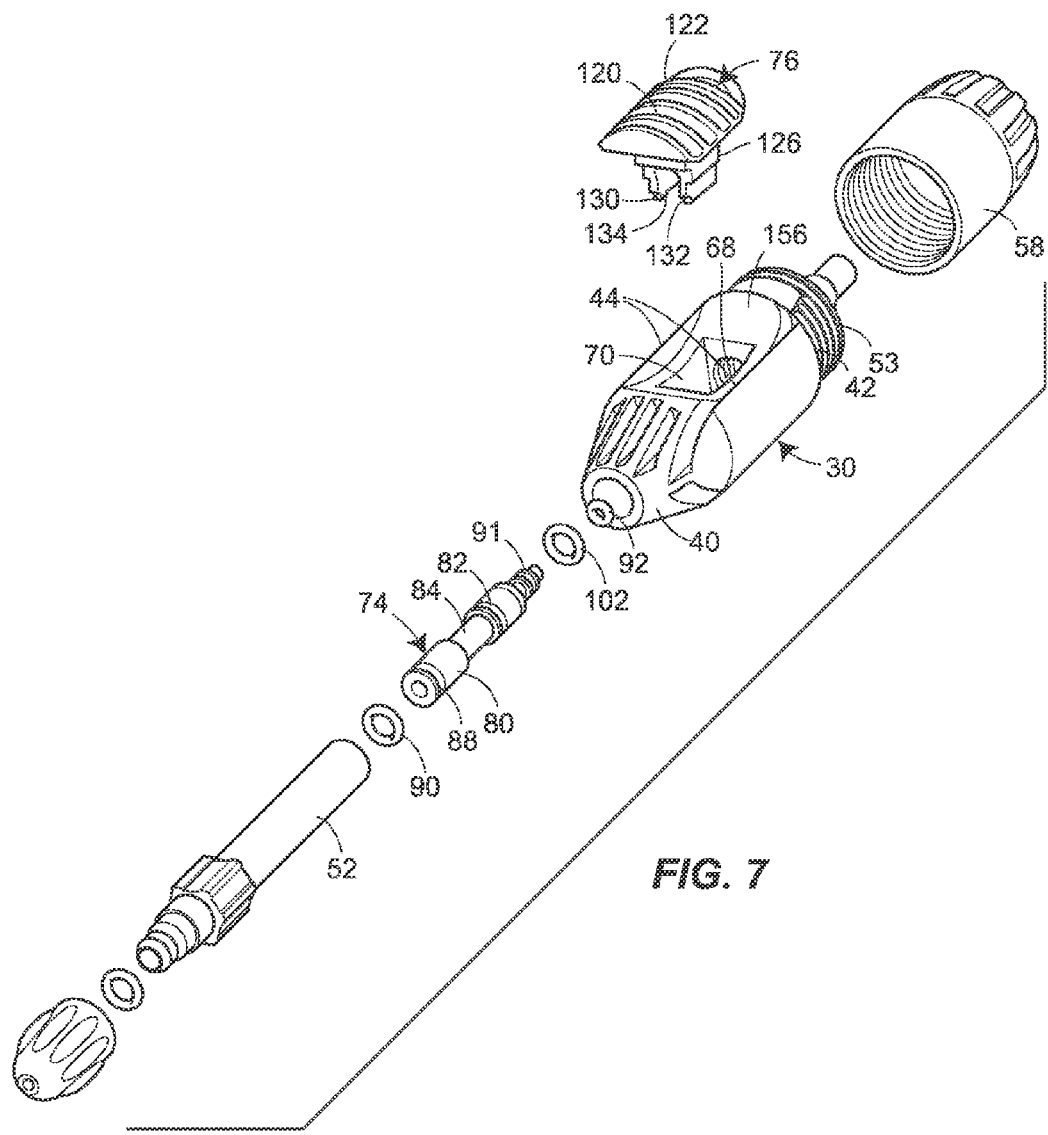
FIG. 7 is an exploded perspective view.
Figure 8:
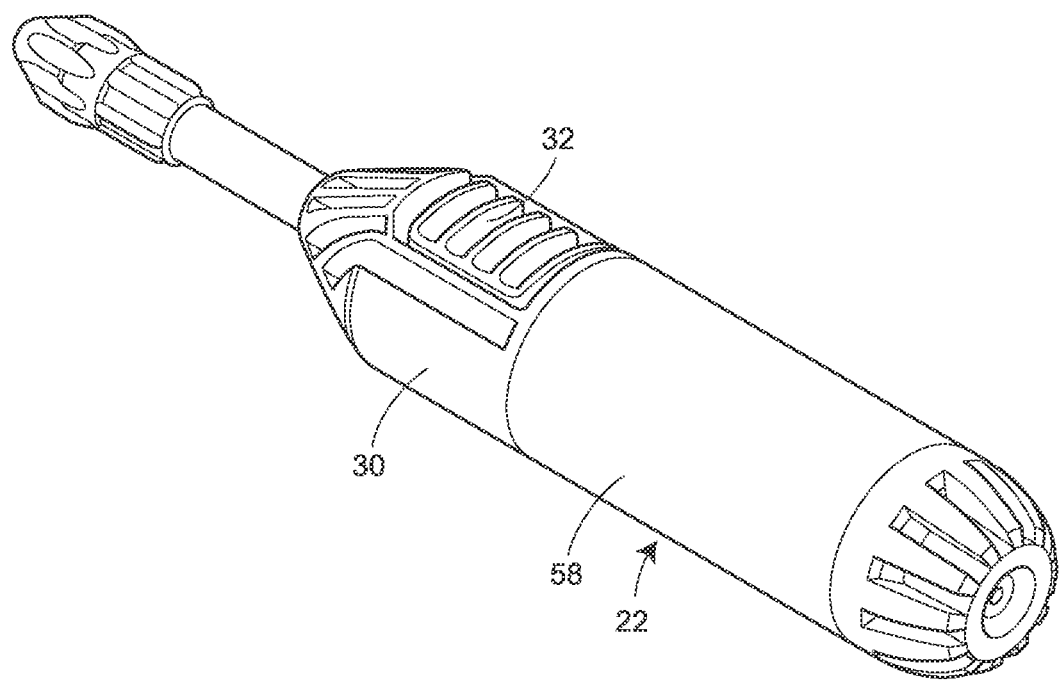
FIG. 8 is a perspective view of another sprayer valve that uses the new invention.
Figure 9:
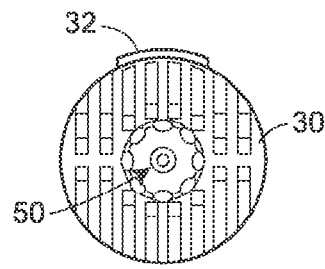
FIGS. 9-11 are front end, side, and rear elevation views of that sprayer valve.
Figure 10:
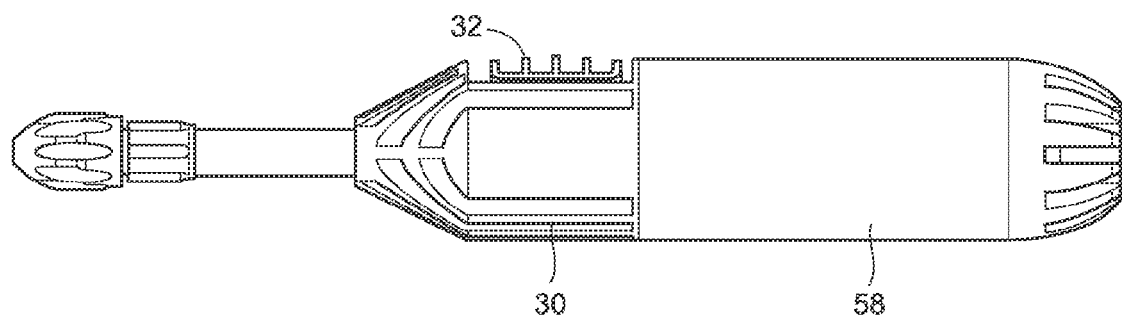
Figure 11:
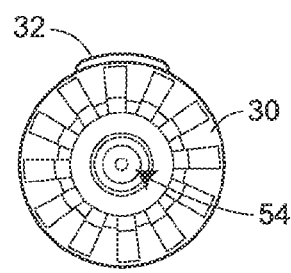
Figure 13:
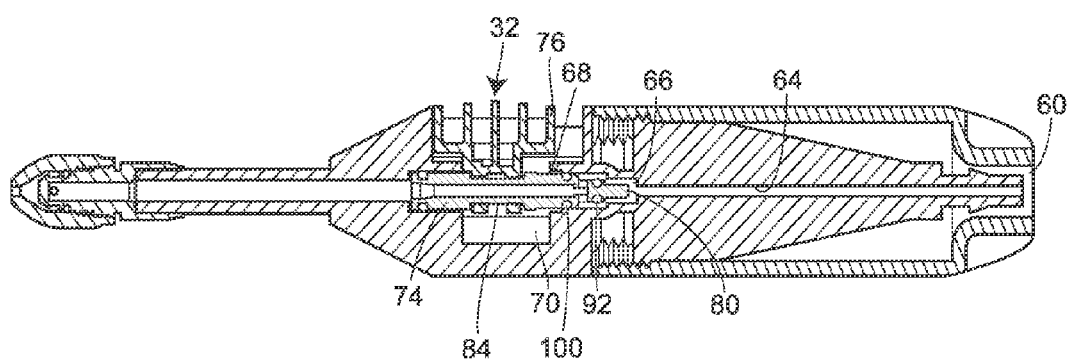
Figure 14:
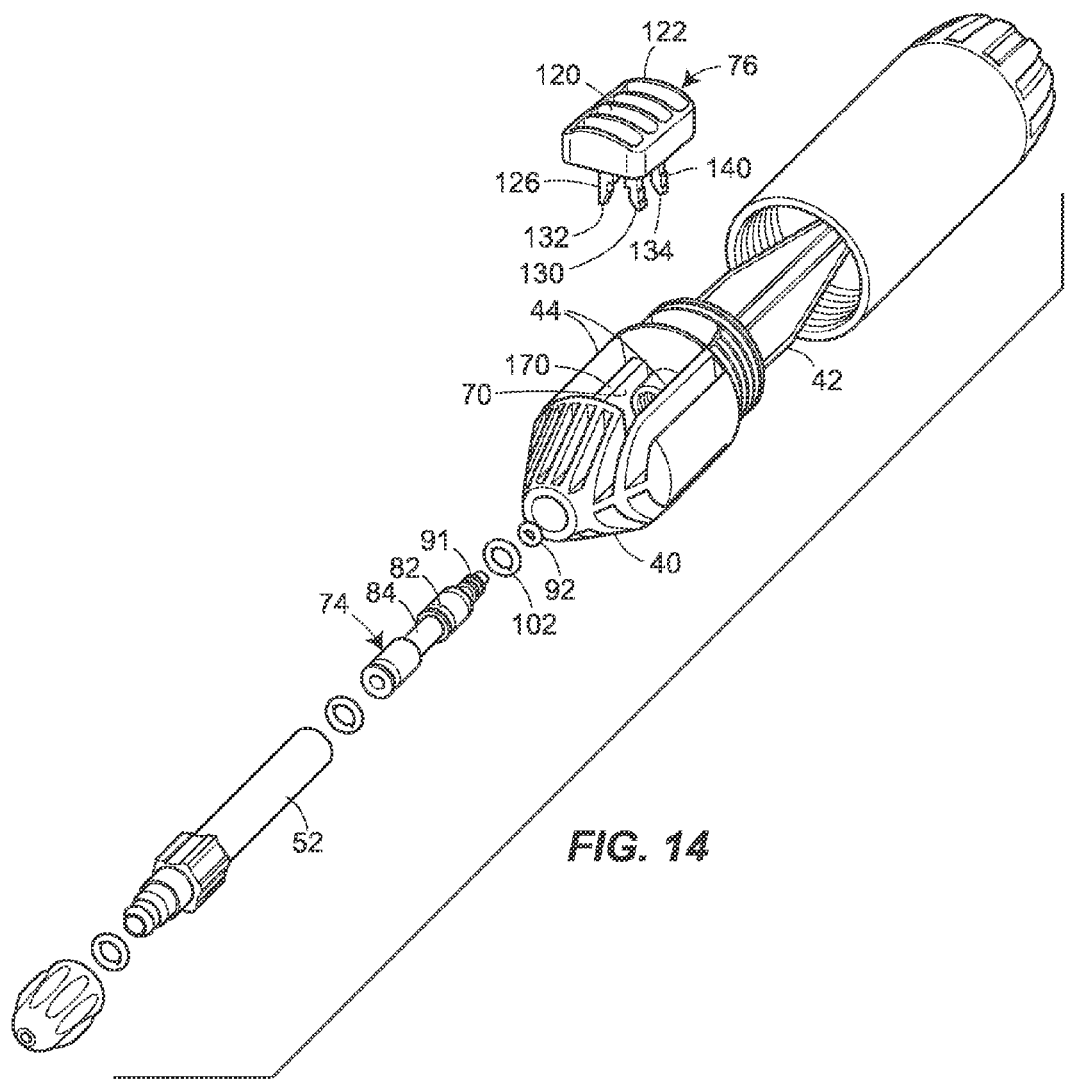
FIG. 14 is an exploded perspective view.
Figure 15:
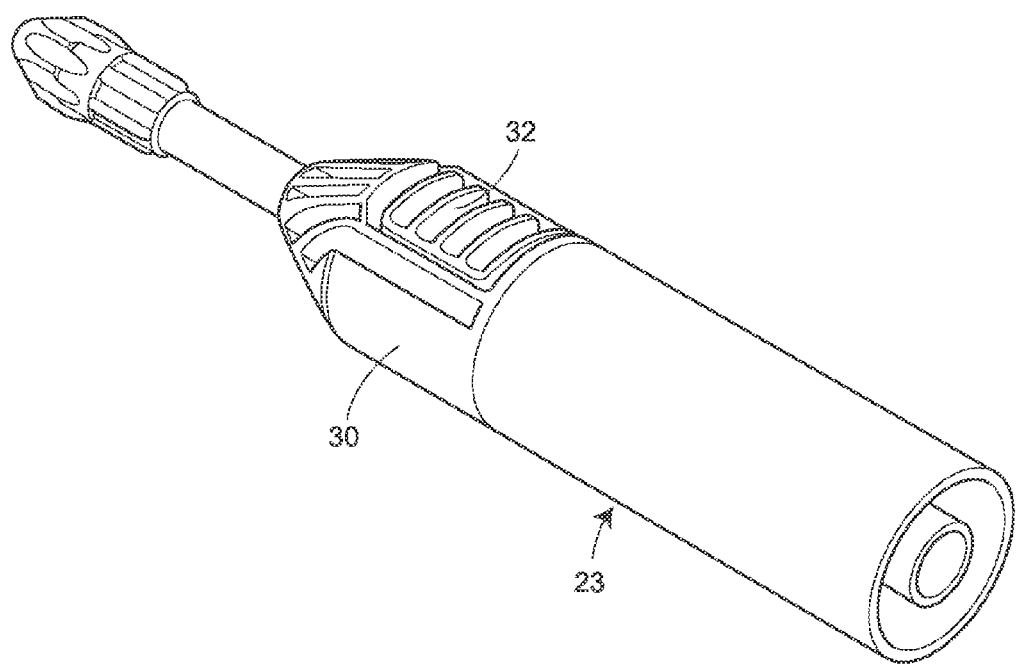
FIG. 15 is a perspective view of third sprayer valve that uses the new invention.
Figure 16:
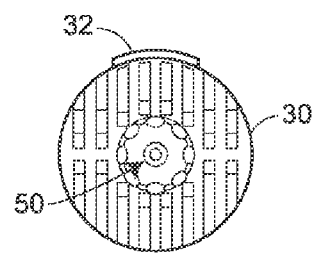
FIGS. 16-18 are front end, side, and rear elevation views of that sprayer valve.
Figure 17:
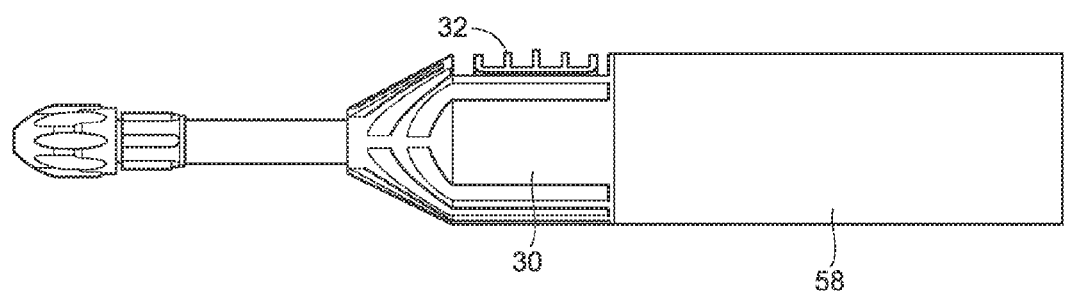
Figure 18:
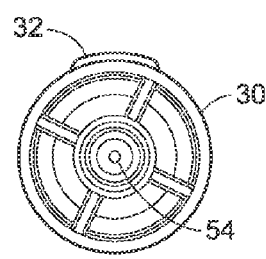
Figure 20:
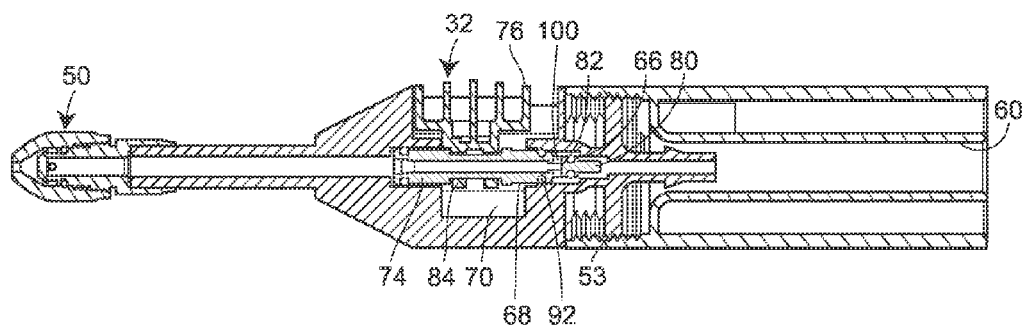
Figure 21:
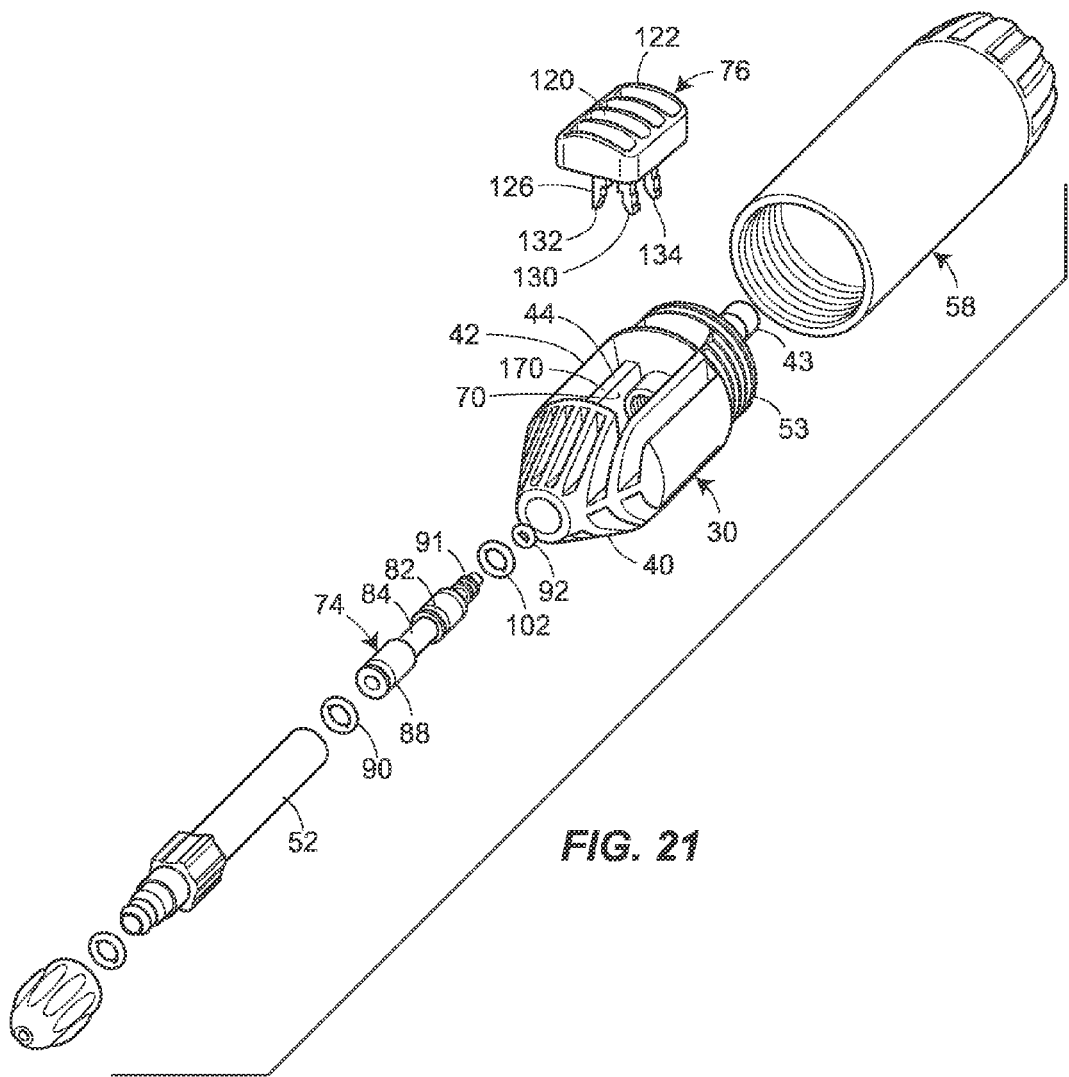
FIG. 21 is an exploded perspective view.

When the slide/pin combination 32 is moved to the open position, as seen in FIGS. 6, 13, and 20, the first upstream section 80 of the pin portion 74 retracts into the second part 66 of the upstream bore 56. In this position, the first part 64 of the upstream bore is opened, enabling liquid in the first part of the upstream bore to flow into the second part of the upstream bore.

Because the second part 66 of the upstream bore 56 has a larger cross-sectional area than the first part 64 of the upstream bore, liquid in the second part can flow past the first upstream section 80 of the pin portion 74. Although it may not always be required, the second upstream section 82 of the pin portion 74 may have a larger cross-sectional area than the first upstream section 80.

The second upstream section 82 of each of the illustrated sprayer valves also has a second radial slot 91 in which is mounted a second o-ring 92. When the slide/pin combination 32 is in the closed position (as seen in FIGS. 5, 12, and 19), this o-ring provides a seal against the second part 66 of the upstream bore 56, acting as a further barrier to flow through the sprayer valve. When the slide/pin combination is moved to the open position (as seen in FIGS. 6, 13, and 20), this o-ring retracts into the third part 68 of the upstream bore. That movement permits liquid in the second part of the upstream bore to flow into the third part 69 of the upstream bore.

The third upstream section 96 of the pin portion 74 of the slide/pin combination 32 fits within the third part 69 of the upstream bore 56. Although not always required, each of the illustrated third upstream sections has a cross-sectional area that is even larger than the cross-sectional area of the second upstream section 80. It is important for the third upstream section to block flow of liquid into the recess 70. Each of the illustrated third upstream sections has a third o-ring 100 that is mounted in a third radial slot 102. This o-ring provides a seal that forms a downstream boundary in the third part of the upstream bore, preventing liquid in that part from flowing into the recess.

The Waist 84

The waist 84 separates the downstream section 82 of the pin portion 74 and the third upstream section 96 of the pin portion. The waist extends between the upstream bore 56 and the downstream bore 48 in the body 30, and can be accessed through the recess 70. The waist has front and rear radial faces 106, 108 that extend outwardly to the upstream end of the downstream section of the pin portion, and to the downstream end of the third upstream section. The radial faces are inclined at an angle of between 45 and 90 degrees with respect to the axis of the sprayer valve. These faces serve as contact points with the slide portion 76, as will be discussed in more detail below. In the illustrated sprayer valves, the waist has a diameter of between ⅛ of an inch and ⅜ of an inch, with radial faces that are between 1/32 of an inch and ⅛ of an inch deep.

The Central Passage 110

A central passage 110 extends through the pin portion 74, providing a channel that conducts liquid from the upstream bore 56 of the body 30 to the downstream bore 48. In the illustrated sprayer valves, the passage is between 1/16 of an inch and ¼ of an inch in diameter, and begins at a series of radial inlets 112 that are located in the second upstream section 80 of the pin portion 74 of the slide/pin combination 32, between the second and third o-rings 92 and 100. In the illustrated sprayer valves, these inlets are between 1/32 of an inch and ⅛ inch in diameter, and extend at right angles from the channel. In some cases, a single inlet would be sufficient.

The central passage 110 in each of the illustrated sprayer valves extends between ¾ of an inch and several inches downstream from the inlets 112. The passage terminates at an outlet 114 that is located downstream of the first o-ring 90. In the illustrated sprayer valves, the outlet is located on a downstream-facing end of the pin portion 74, although other locations are also possible.

As evident from FIGS. 6, 13, and 20, when the slide/pin combination 32 is in the open position, liquid that has entered the upstream bore 56 of the body 30 flows into the central passage 110 through the inlets 112, is conducted past the recess 70, and is released through the outlet 114 into the downstream bore 48, downstream of the first o-ring 90.

The Slide Portion 76

The slide portion 76 of the slide/pin combination 32 locks onto the pin portion 74 and provides a surface that a user can move linearly to move the slide/pin combination axially between the open and closed positions. It will generally be preferred that this element be made from molded plastic, but in many arrangements other materials can also be used. In all three illustrated sprayer valves, the slide portion has a base section 120 that fits within the recess 70 in the body 30, providing an exposed outer surface 122 that can be accessed by a user. The illustrated base sections are between ½ inch and several inches in length, with a similar or slightly narrower width.

The slide portion 76 on each of the illustrated sprayer valves also has resilient arms 126 that engage the front and rear radial faces 106, 108 on the waist 84 of the pin portion 74, providing a rigid axial connection between the slide portion and the pin portion. This rigid connection (in which some rotation of the pin portion about its axis is possible) results in linear movement of the slide portion being directly transferred to the pin portion, without the need for converting one form of movement to another kind of movement (i.e., rotational movement to linear movement), as was required in the prior version of the sprayer valve. To provide the required rigid connection, the illustrated arms extend over opposed sides of the waist and have tangs 130 that lock onto a lower side of that waist. The illustrated arms have concavely curved inner surfaces that match the convexly curved outer profile of the waist on the pin portion.

During assembly of the illustrated sprayer valves, distally sloping ramp portions 132 on the tangs 130 first engage the waist 84 as the slide portion 76 is initially located within the recess 70. These ramp portions deflect outwardly as the slide portion is pressed downwardly into the recess, opening the spacing between the tangs. Once points 134 on the tangs pass the widest point of the waist, the arms spring back, trapping the waist between the tangs and holding the slide portion in place without the need for separate fasteners such as screws, etc.

In each of the illustrated sprayer valves, the slide portion 76 has one or more sets of spaced arms 126. Axial movement between the pin portion 74 and the slide portion is resisted by (1) engagement of a downstream facing face 140 on the arms with the front radial face 106 on the waist section and (2) and engagement of an upstream facing face 142 on the arms with the back radial face 108 on the waist. Other arrangements can also be used.

Details Particular to the First Embodiment

The sprayer valve seen in FIGS. 1-7 is an arrangement that uses the same type body 30 that was used on previous H.D. Hudson sprayer valves that used a lever-style on/off switch. That body has an opposed chamber 150 that is positioned radially across from the recess 70, on the opposite side of the pin portion 74 of the slide/pin combination 32. A radial groove in that chamber has an internal, upstream-facing shoulder 152 that is spaced from the pin portion. In prior, lever-type sprayer valves, that shoulder served as a fulcrum for the lever-style switch.

To accommodate a lever-style switch, the recess 70 within the spaced wall segments 44 in the body 30 used in this sprayer valve has a concavely curved outer surface 156. To fit within the recess, the slide portion 76 has a convexly curved base 158. An outwardly extending flattened section 160 extends out of the recess and fits over linear parts 162 of the wall segments, with curved sections of the base extending forwardly and rearwardly from the flattened section, laterally between the spaced wall segments.

In this sprayer valve, the downstream facing face 140 and the upstream facing face 142 of the slide portion 76 of the slide/pin combination 32 are both part of the same wide arms 126. As will be seen below, other arrangements are also possible.

This sprayer valve is particularly useful because it enables a manufacturer to produce a sprayer valve with an axially-moving switch using a body that was designed for use with a lever-style switch, without the need for separate fasteners. Putting the old body to a new use can facilitate manufacturing and save costs.

Details Particular to the Second and Third Embodiments

The sprayer valves seen in FIGS. 8-21 use a different body 30 than the one seen in FIGS. 1-7. In these sprayer valves, the recess 70 does not have a curved outer surface. Instead, it has recessed linear wall segments 170 that extend axially on opposed sides of the pin portion 74. The slide portion 76 has a planar base 172 that slides along an outer surface of those linear wall segments. This arrangement reduces the risk of the slide portion being wedged away from the body, and inadvertently detaching from the pin portion 74.

In these sprayer valves, the downstream facing face 140 and the upstream facing face 142 of the slide portion 76 of the slide/pin combination 32 are parts of separate arms 126 that are spaced apart. This arrangement saves material and thus may reduce costs.

This description of various embodiments of the invention has been provided for illustrative purposes. Revisions or modifications may be apparent to those of ordinary skill in the art without departing from the invention. The full scope of the invention is set forth in the following claims.

The invention claimed is:

1. A springless valve that is used for a liquid sprayer and has:
    a body that has:
    (a) a front section that has a downstream bore that communicates with a liquid nozzle,
    (b) a rear section that has an upstream bore that
        (i) can be attached to a liquid supply line,
        (ii) has a first part that has a relatively small cross-sectional area that communicates with a liquid supply inlet,
        (iii) has a second part that is downstream of the first part and has a larger cross-sectional area than the first part, and
        (iv) has a third part that is downstream of the second part and has a larger cross-sectional area than the second part, and
    (c) spaced wall segments that extend from the front section to the rear section and define a recess; and
    a slide/pin combination that is mounted for axial movement with respect to the body between an open position and a closed position, and has:
    (a) a pin portion that has:
        (i) a downstream section that fits within the downstream bore, has a first radial slot, and has a first o-ring that is mounted in the first radial slot and forms an upstream seal in the downstream bore,
        (ii) a first upstream section that fits snugly within the first part of the upstream bore when the slide/pin combination is in the closed position, and retracts into the second part of the upstream bore when the slide/pin combination is in the open position, enabling liquid in the first part of the upstream bore to flow into the second part of the upstream bore,
        (iii) a second upstream section that has a larger cross-sectional area than the first section, has a second radial slot, and has a second o-ring that is mounted in the second radial slot, provides a seal against the second part of the upstream bore when the slide/pin combination is in the closed position, and retracts into the third part of the upstream bore when the slide/pin combination is moved to the open position, permitting liquid in the second part of the upstream bore to flow into the third part of the upstream bore,
        (iv) a third upstream section that fits within the third part of the upstream bore, has a larger cross-sectional area than the second section, has a third radial slot, and has a third o-ring that is mounted in the third radial slot and forms a downstream seal in the third part of the upstream bore,
        (v) a central passage that extends from an outlet that is located downstream of the first o-ring to one or more inlets that are located between the second and third o-rings, and
        (vi) a narrowed waist that is located between the downstream section of the pin portion and the third upstream section of the pin portion and has front and rear radial faces, and
    (b) a slide portion that (i) fits with the recess in the body, (ii) has arms that snap around the narrowed waist, engage the front and rear radial faces on that waist, and connect the slide portion to the pin portion so that the slide portion does not rotate with respect to the axis of the slide/pin combination, and (iii) can be accessed by a user to move the slide/pin combination axially between the open and closed position.

2. A springless valve as recited in claim 1, in which the body also has:
    an opposed chamber that is positioned radially across from the recess, on the opposite side of the pin portion of the slide/pin combination, and
    a radial groove in the chamber that has an internal, upstream-facing shoulder that is spaced from the pin portion.

3. A springless valve as recited in claim 1, in which:
    the recess has recessed linear wall segments that extend axially on opposed sides of the pin portion; and
    the slide portion has a planar base that slides along an outer surface of the linear wall segments.

4. A springless valve that is used for a liquid sprayer and has:
    a body that has:
    (a) a front section that has a downstream bore that communicates with a liquid nozzle,
    (b) a rear section that has an upstream bore that
        (i) can be attached to a liquid supply line,
        (ii) has a first part that has a relatively small cross-sectional area that communicates with a liquid supply inlet,
        (iii) has a second part that is downstream of the first part and has a larger cross-sectional area than the first part, and (iv) has a third part that is downstream of the second part and has a larger cross-sectional area than the second part, and (c) spaced wall segments that extend from the front section to the rear section and define a recess; and a slide/pin combination that is mounted for axial movement with respect to the body between an open position and a closed position, and has:

(a) a pin portion that has:
   (i) a downstream section that fits within the downstream bore, has a first radial slot, and has a first o-ring that is mounted in the first radial slot and forms an upstream seal in the downstream bore,
   (ii) a first upstream section that fits snugly within the first part of the upstream bore when the slide/pin combination is in the closed position and retracts into the second part of the upstream bore when the slide/pin combination is in the open position, enabling liquid in the first part of the upstream bore to flow into the second part of the upstream bore,
   (iii) a second upstream section that has a larger cross-sectional area than the first section, has a second radial slot, and has a second o-ring that is mounted in the second radial slot, provides a seal against the second part of the upstream bore when the slide/pin combination is in the closed position, and retracts into the third part of the upstream bore when the slide/pin combination is moved to the open position, permitting liquid in the second part of the upstream bore to flow into the third part of the upstream bore,
   (iv) a third upstream section that fits within the third part of the upstream bore, has a larger cross-sectional area than the second section, has a third radial slot, and has a third o-ring that is mounted in the third radial slot and provides a seal that forms a downstream boundary in the third part of the upstream bore,
   (v) a central passage that extends from an outlet that is located downstream of the first o-ring to one or more inlets that are located between the second and third o-rings, and
   (vi) a narrowed waist that is located between the downstream section of the pin portion and the third upstream section of the pin portion and has front and rear radial faces, and (b) a slide portion that:
   (i) has a base section that fits within the recess in the body and is limited to linear motion,
   (ii) has resilient arms that engage the front and rear radial faces on the narrowed waist, extend over opposed sides of the narrowed waist, have tangs that lock onto a lower side of that waist, and connect the slide portion to the pin portion so that the slide portion does not rotate with respect to the axis of the slide/pin combination, and
   (iii) can be accessed by a user to move the slide/pin combination axially between the open and closed position.

\* \* \* \* \*